June 2, 1942.  T. P. MORRISON  2,285,298
RETORT CLEANOUT MACHINE
Filed April 10, 1939  6 Sheets-Sheet 1

INVENTOR,
Thomas P. Morrison.
Hovey & Hamilton,
ATTORNEYS

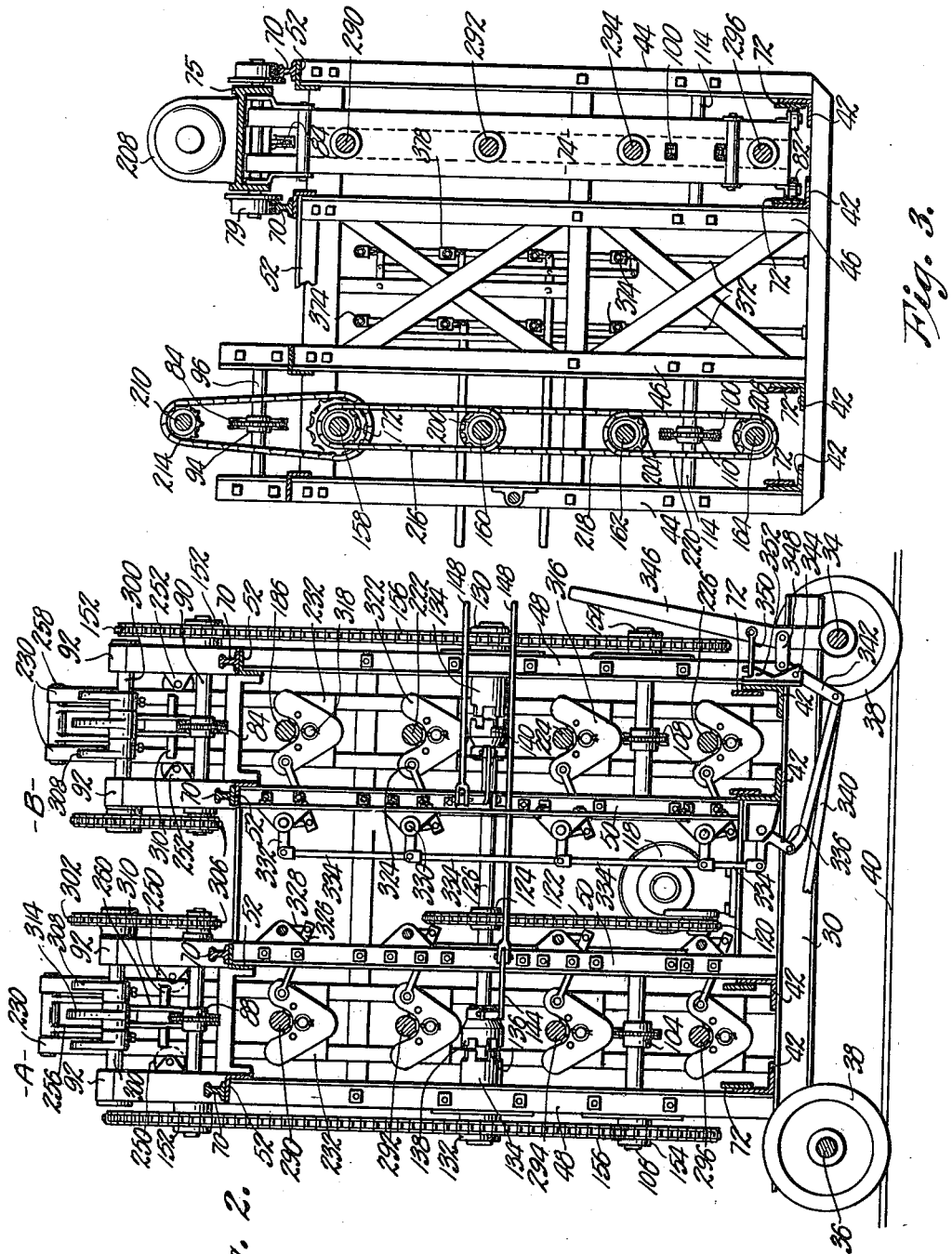

June 2, 1942.   T. P. MORRISON   2,285,298
RETORT CLEANOUT MACHINE
Filed April 10, 1939   6 Sheets-Sheet 4
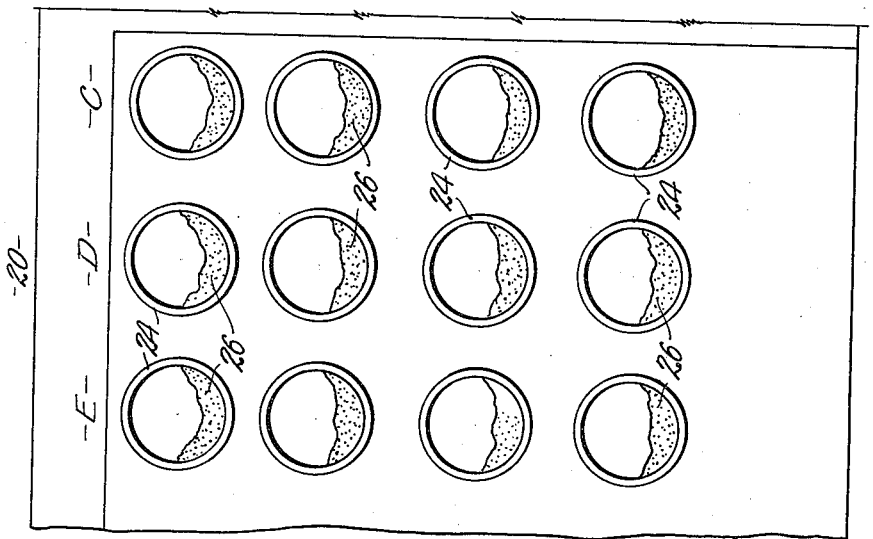
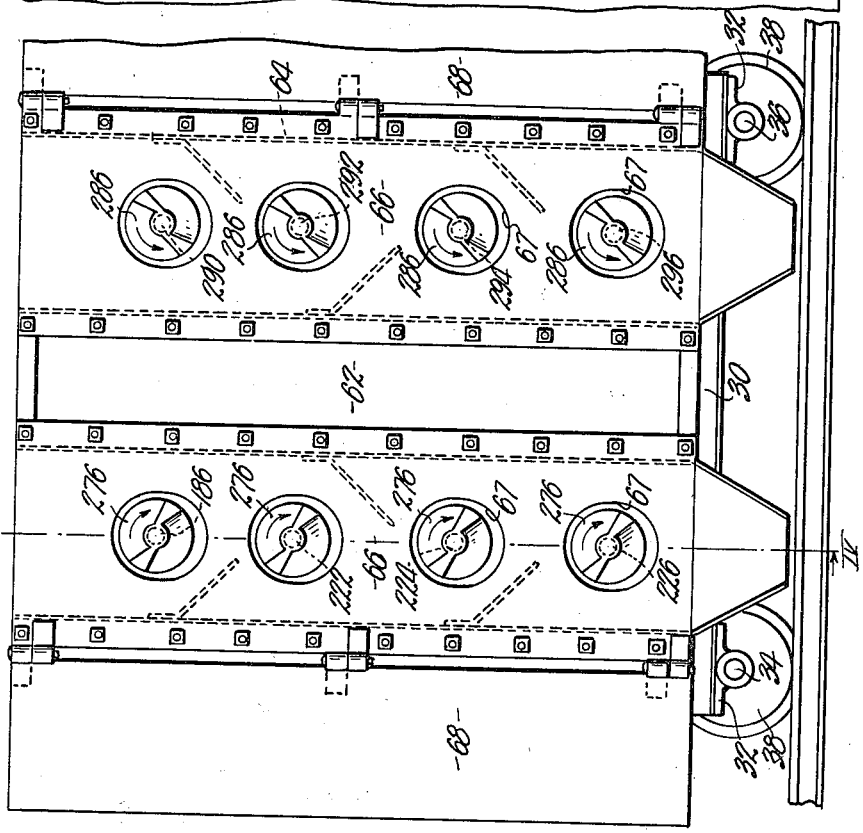
INVENTOR,
Thomas P. Morrison.
BY
Hovey & Hamilton,
ATTORNEYS.

June 2, 1942.    T. P. MORRISON    2,285,298
RETORT CLEANOUT MACHINE
Filed April 10, 1939    6 Sheets-Sheet 5

INVENTOR,
Thomas P. Morrison.
BY Hovey & Hamilton,
ATTORNEYS.

June 2, 1942.   T. P. MORRISON   2,285,298
RETORT CLEANOUT MACHINE
Filed April 10, 1939   6 Sheets-Sheet 6

INVENTOR,
Thomas P. Morrison.
BY Hovey & Hamilton,
ATTORNEYS.

Patented June 2, 1942

2,285,298

UNITED STATES PATENT OFFICE 2,285,298

RETORT CLEANOUT MACHINE

Thomas P. Morrison, Blackwell, Okla., assignor of one-tenth to H. K. Highsmith

Application April 10, 1939, Serial No. 267,029

9 Claims. (Cl. 15—104.10)

This invention relates to improvements in retort clean-out machines and particularly to a machine for cleaning retorts in zinc furnaces.

The principal object of this invention is the provision of a retort clean-out machine operable to successively pass oppositely rotated, screw-shaped clean-out tools into and out of the retort.

Another object of the present invention is the provision or a retort clean-out machine wherein the clean-out tool is so constructed and mounted as to follow the contour of the retort during the cleaning operation.

A further object of the invention is the provision of a retort clean-out machine wherein the tool carrying shafts are independently, horizontally adjustable for registering with the open mouth of the adjacent retort.

Another object of this invention is the provision of a novelly constructed and operated toggle supported tool shaft carrier which is timed to become inoperative as the tool is positioned in the retort.

A still further object of the present invention is the provision of a machine having a plurality of series of rotated clean-out tools adapted to simultaneously enter into and follow the contour of the various retorts of a retort furnace, as the tools of the different series are rotated in opposite directions.

Another object of this invention is the provision of a retort clean-out machine having a plurality of tools carried by the free ends respectively of tool shafts universally connected with driving means.

With these as well as other objects, which will appear during the course of the specification in view, reference will now be had to the drawings, wherein:

Fig. 2 is an enlarged irregular transverse sectional view with a portion of the section taken on line II—II of Fig. 1, looking toward the front of the machine.

Fig. 3 is an enlarged irregular transverse sectional view with a portion of the section taken on line III—III of Fig. 1, looking toward the rear of the machine.

Fig. 5 is a front elevation of the machine.

Fig. 6 is a diagrammatic elevation of the end tiers of a zinc retort furnace.

Figure 1:
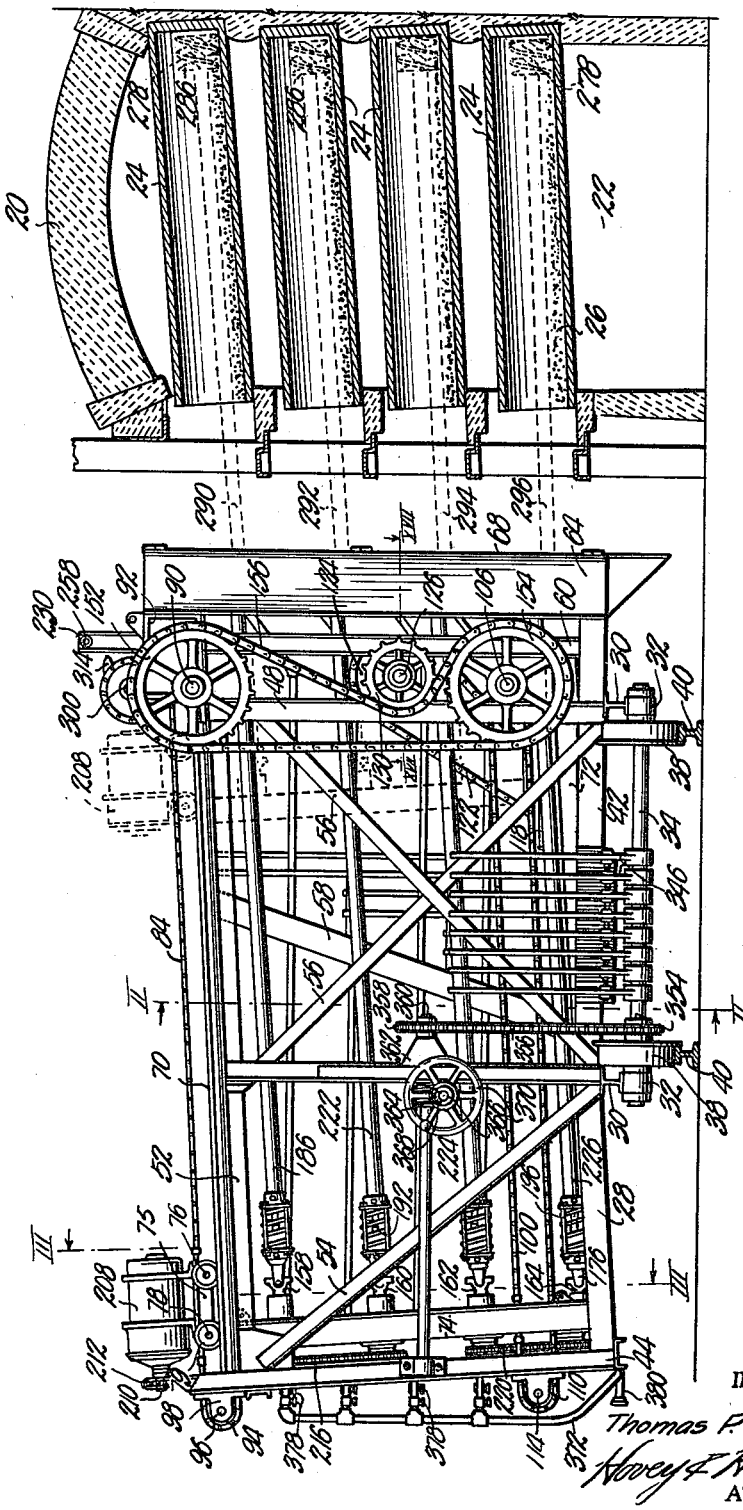
Figure 1 is a side elevation of a retort clean-out machine, shown in operative relation to a retort furnace and embodying this invention.
Figures 9, 10:
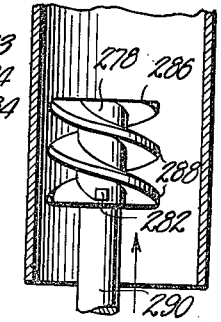
Fig. 9 is an enlarged cross sectional view of a retort showing a left-hand screw-threaded tool in the operative position therein.
Fig. 10 is a view similar to Fig. 9 with a right-hand screw-threaded tool shown.

Throughout the several views, like reference characters designate similar parts, and the numeral 20 is a zinc retort furnace comprising a furnace chamber 22 in which is mounted a plurality of similar vertical tiers of retorts 24, in which the zinc ore is heat treated and in which a residue or slag 26 accumulates (see Figs. 1, 9 and 10).

The procedure of treating of zinc ore is not of importance in this invention, which contemplates only the removal of the hot slag from the retorts in order to maintain them in proper condition for receiving new charges. The retorts, as shown, are slightly inclined to facilitate charging, however, the furnace may be of any desired shape or structure. These retorts are made of a ceramic material, and due to the intense heat and loads they are subjected to, become deformed and irregular in shape.

When new, the superposed retorts in the various tiers are equally spaced, also the tiers are arranged in similar groups with corresponding tiers of the adjacent groups equally spaced and may consist of a large number of groups with the corresponding retorts of the various tiers in substantially horizontal alignment.

The retort clean-out machine proper comprises a fabricated frame structure 28 mounted on spaced apart transverse beams 30, carrying bearings 32, in which are mounted parallel axles 34 and 36. Flanged wheels 38 mounted on axles 34 and 36, are adapted to ride on track rails 40, disposed in parallel relation to the front face of the furnace. When so mounted, the retort clean-out machine may be moved in either direction parallel with the furnace.

Frame structure 28 consists primarily of longitudinal base angles 42 which rest on beams 30 and support two pairs of vertically disposed members 44 and 46 at their rear ends, and two pairs of vertical members 48 and 50, in spaced apart relation to and adjacent the front ends of angles 42. These upright members are joined together by horizontally disposed top members 52.

Intermediate vertically disposed brace bars 54 and 56 tend to strengthen and make rigid the frame structure. The obliquely disposed frame members 58 are adapted to support shaft bearings as hereinafter described.

Figure 17:
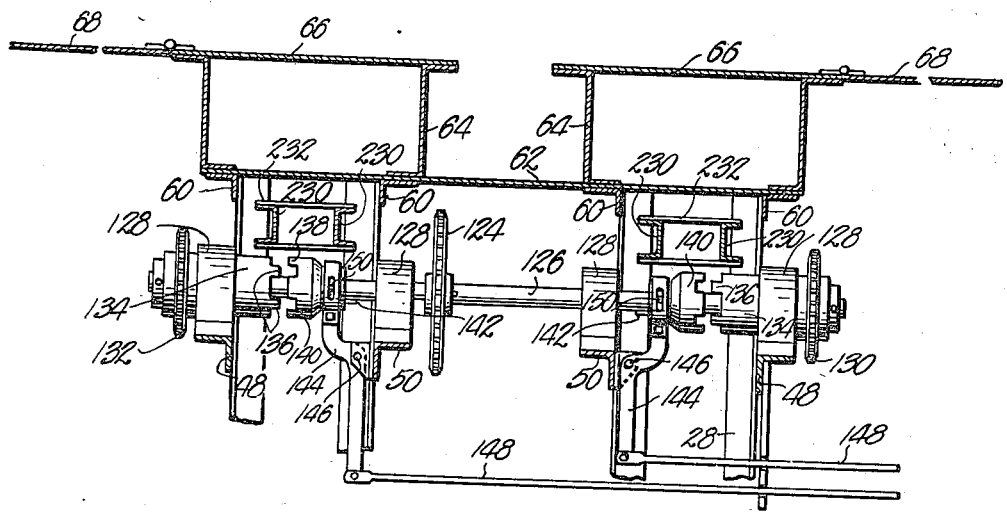
Fig. 17 is a fragmentary horizontal sectional view taken on line XVII—XVII of Fig. 1.

Base members 42 and top members 52 are extended forwardly of members 48 and 50 and serve to support uprights 60, which in turn carry the vertically disposed plate 62, see Fig. 17.

Spaced forwardly of plate 62 by Z members 64 is a pair of face plates 66. To the outside edges of these face plates 66 are hingedly mounted, heat deflector wings 68. These plates 62, 66 and wings 68 extend substantially the full height of the machine and function as heat deflectors whereby the workmen are protected from the high temperatures of the furnace, as are also those portions of the machine adjacent the front of the furnace. Each face plate 66 is provided with openings 67 through which the tools and tool shafts are projected. This frame, as is very evident, consists of two spaced apart sections A and B, each section being similar and adapted to carry a vertical row of substantially horizontally disposed tool shafts. For convenience, and due to the similarity of the sections, but one will be described in the following description.

The top frame members 52 are slightly forwardly and upwardly inclined to conform to the inclination of the retorts referred to above, and serve to support a pair of rails 70. A pair of spaced apart face plates 72 are carried by frame 28 vertically below and parallel with rails 70 and adjacent lower members 42.

A carriage 74 comprises a body member 75 carrying spaced apart axles 76 and 78 on each of which are mounted a pair of wheels 79, whereby the body member is adapted to move along said rails 70. Pivotally mounted on axle 78 and depending therefrom, is a fabricated framework member 80, which extends adjacent the bottom frame members 42 and is provided with a pair of opposed rollers 82 which bear against face plates 72 to preclude movement of member 80 transversely of the machine.

This carriage 74 is moved along the rails 72 by the following mechanism:

A sprocket chain 84 is adjustably secured by bolt and nut 86 to the forward part of body member 75 and is trained over a sprocket wheel 88 which is rigidly secured to shaft 90 mounted in bearing plates 92 carried respectively by uprights 60. The sprocket chain 84 extends longitudinally of the machine and operatively engages sprocket wheel 94 mounted for rotation with shaft 96, journalled in bearings 98 carried by the rear uprights 44 and 46 respectively. The other end of chain 84 is adjustably secured to the rear side of body member 75, thus making it possible to drive the carriage in either direction as the chain is driven, as hereinafter described.

To provide proper and even movement of carriage 74, a similar chain drive, as described above, is provided adjacent the lower portion of the carriage (see Fig. 4), and consists of a chain 100 secured at its one end by adjustable bolt and nut 102 to the front side of member 80 thence around sprocket wheel 104, which is mounted for rotation with shaft 106, mounted in bearings 108 carried by frame members 48 and 50 respectively. The chain is then extended lengthwise of the machine and is trained over sprocket wheel 110 and then secured by its other end to the rear side of carriage member 80 by means of the adjustable bolt and nut 112. Sprocket 110 is mounted for rotation on shaft 114, which is mounted in bearings 116 carried at the rear side of frame members 34 and 36 respectively.

Figure 4:
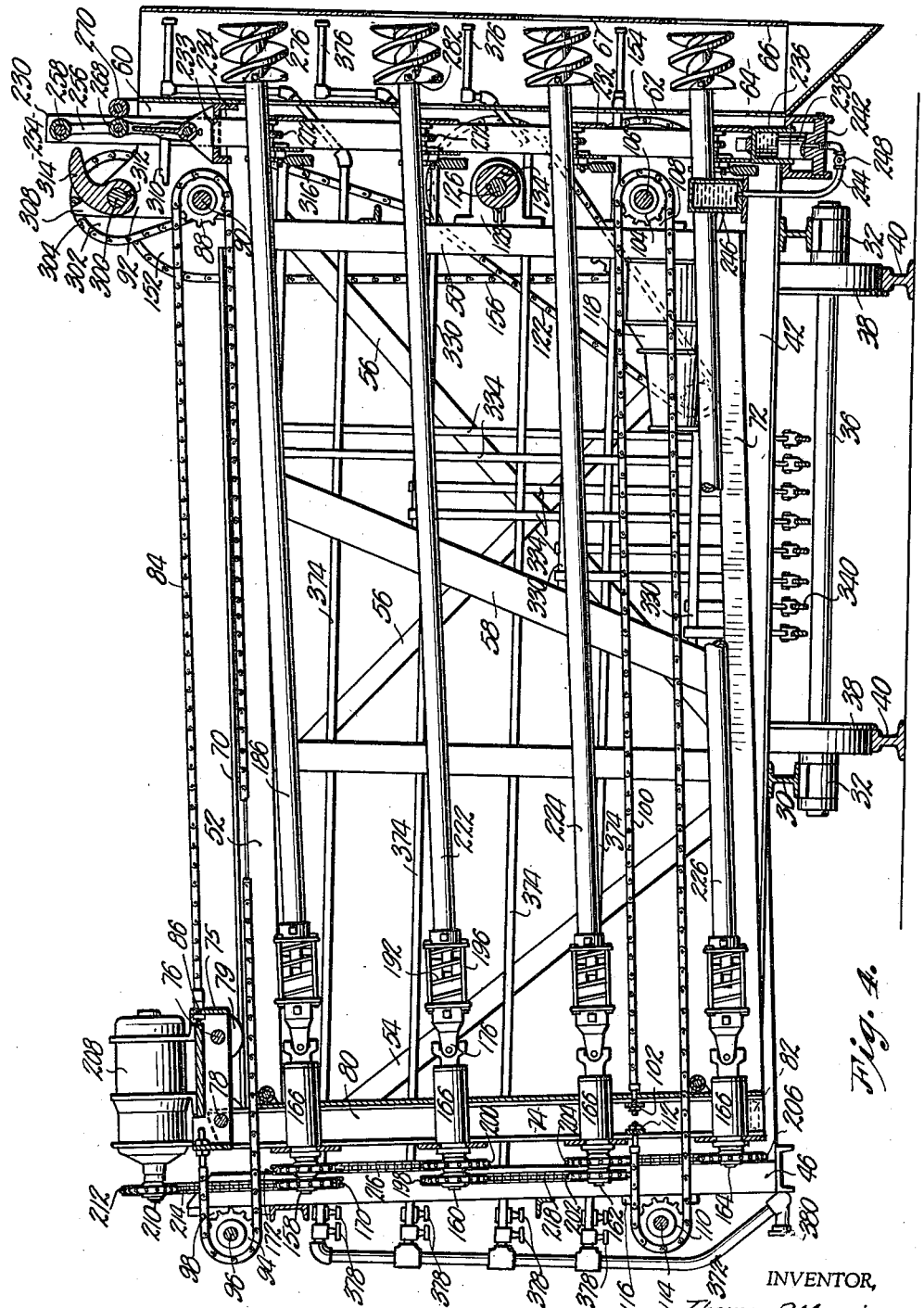
Fig. 4 is a longitudinal sectional view of the machine taken on line IV—IV of Fig. 5.

Referring now to Figs. 1, 2 and 4, reference will be had to the carriage driving mechanism which is common to both carriages A and B for simultaneous or selective operation.

A reversible motor 118 mounted on frame 28 intermediate carriage frame sections A and B is provided with a driven sprocket wheel 120. An endless sprocket chain 122 in operative relation with sprocket 120 is trained over sprocket wheel 124, which in turn is mounted on drive shaft 126, rotatably carried in bearings 128 which are secured respectively to frame members 48 and 50, see Fig. 17. This shaft is disposed transversely of the machine and extends beyond both sides of the frame 28 to receive clutch controlled sprocket wheels 130 and 132. The hubs 134 of sprockets 130 and 132 are provided at their inner ends with clutch teeth 136 which are adapted to be engaged by teeth 138 of the sliding clutch member 140 which is splined to shaft 126 by key 142. A yoke lever 144 pivotally mounted at 146 and operable by rod 148 is adapted to engage pins 150 to cause a movement of clutch member 140 as the operating rod is moved. The clutches for both sprocket wheels 130 and 132 are similar in construction and operation and are independently operable. Sprocket wheels 152 and 154 are respectively secured to shafts 90 and 106 for rotation therewith. A chain 156 trained over sprocket wheels 130, 152 and 154 serves to drive shafts 90 and 106 at the same rate of rotation thereby driving chains 84 and 100 at the same rate of speed to maintain carriage 74 in proper operative position as it is reciprocated.

Figure 7:
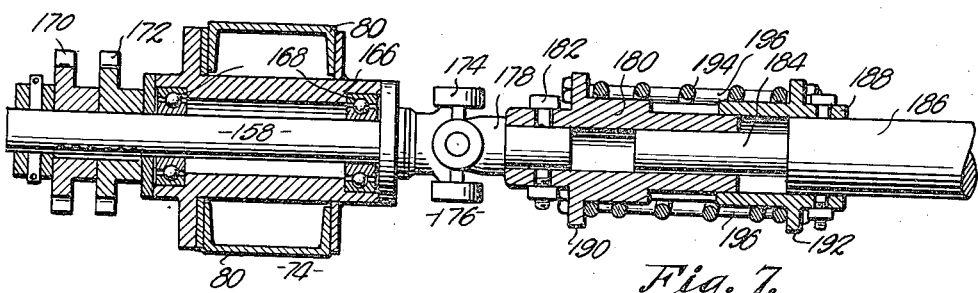
Fig. 7 is an enlarged sectional view of a drive shaft and its connection with the tool shaft.

Reference will now be had to the tool shaft drive mechanism best shown in Figs. 1, 3, 4 and 7. A series of spaced apart stub shafts 158, 160, 162 and 164, corresponding to the number of retorts in each tier and spaced apart distances equal to the vertical spacing of the retorts is provided. The detail showing of the mounting of these stub shafts in Fig. 7, shows the bearing member 166 securely mounted in the fabricated member 80 to support roller bearings 168 which carry the stub shaft 158. To the rear end of shaft 158 are keyed two similar sprocket wheels 170 and 172. The front portion of shaft 158 carries one member 174 of a universal joint 176 which is connected in the usual manner with the other portion 178 of the joint. A sleeve 180 secured by bolt 182 to the universal joint member 178 is adapted to receive for longitudinal movement the reduced end portion 184 of tool shaft 186. A tubular member 188 rigidly secured to tool shaft 186 is adapted for longitudinal, telescoping movement on the forward end of sleeve 180, and is secured against relative rotary movement thereto. Between flange 190 on sleeve 180 and flange 192 which is integral with tubular member 188, is a helical spring 194 which cushions and limits the relative longitudinal movements of the sleeve 180 and tool shaft 186. Bolts 196 extending through flanges 190 and 192 serve to prevent the separation of the tool shaft 186 from sleeve 180 and holds the spring 180 under compression. The sprocket wheels carried by stub shaft 160 are designated as 198 and 200, those carried by stub shaft 162, as 202 and 204, and the sprocket carried by stub shaft 164 is indicated as 206. Mounted on carriage body member 76 is a motor 208 having a drive shaft 210 to which is rigidly secured a sprocket wheel 212. The following chain drive causes the several stub shafts to rotate at the same rate of speed and in like direction.

The sprocket chain 214 interconnects sprockets 212 and 170; chain 216 interconnects sprocket 172 with sprocket 200; chain 218 drives sprocket 202 through sprocket 198; and chain 220 interconnects sprocket 204 with sprocket 206 to drive stub shaft 164.

Gear, belt or any other suitable drive might be substituted for this chain drive, also by changing the relative sizes of the sprockets any differential speed of the various stub shafts might be obtained whenever found desirable.

The tool shafts driven by stub shafts 158, 160, 162 and 164 are designated as 186, 222, 224 and 226 respectively and extend to the forward portion of the frame and are adapted to be moved forwardly to extend substantially the full depth of the respective retorts, as shown in dotted lines in Fig. 1.

The forward end portions of the tool shafts are normally supported by the following mechanism, which is adapted to be moved to an inoperative position during certain operations of the machine.

A carrier frame 228 comprising spaced apart, parallel channel members 230 joined together by transverse plates 232, is mounted vertically at the front end of the machine to extend through a guide opening 233 formed in top plate 234, carried by frame 28 and has an inverted cylinder 236 at its lower extremity telescoping with a stationary piston 238. The cylinder is shown in the normal raised position in both figures with that portion of cylinder above the piston filled with a suitable fluid. The piston is provided with a port 242 which communicates with a conduit 244 which in turn communicates with a vented container 246 positioned above the cylinder 236. A valve 248 is adjustable to regulate the flow of the fluid from the cylinder to the container.

When the carrier frame support 228 is released as hereinafter described, the weight of the parts sets up a pressure of the fluid in the cylinder 236 and causes it to pass to the container 246 through valve 248, thus acting as a dash-pot to retard the movement of the carrier frame. When the carrier frame is raised to the normal position, the fluid will flow, by gravity, and because of the partial vacuum formed in the cylinder, to again substantially fill the cylinder.

As a further guide to insure proper positioning and moving of carrier frame 228, rollers 250 rotatably mounted in brackets 252 are adapted to engage in the troughs of the oppositely disposed channels 230, see Fig. 2.

Figure 15:
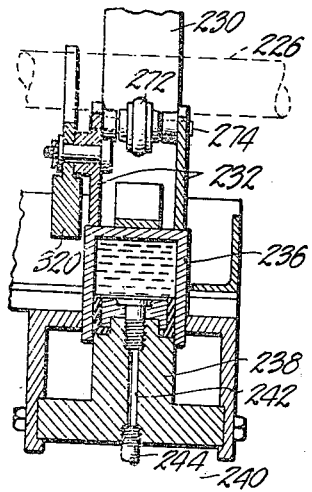
Fig. 15 is a vertical section taken on line XV—XV of Fig. 16.
Figure 16:
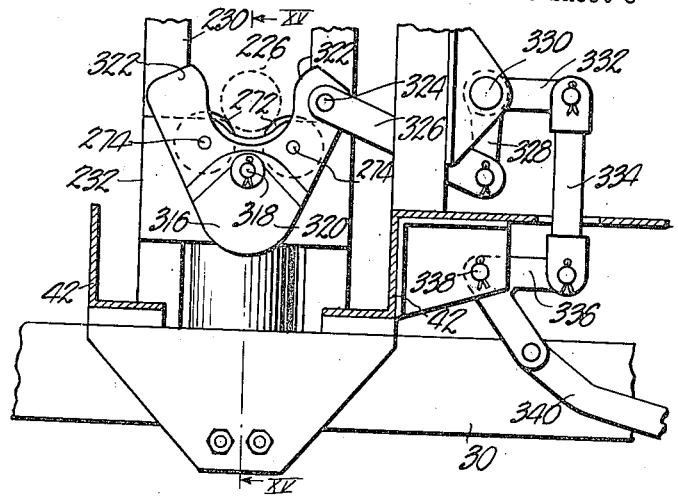
Fig. 16 is an enlarged elevational view of the tool shaft carrier and transverse shifting device with the associated framework.

Referring to Figs. 15 and 16, it will be noted that the tool shaft shown in dotted lines, is adapted to rest on the peripheries of the spaced apart rollers 272 which are mounted for free rotation on pins 274 carried by plates 232.

Figure 8:
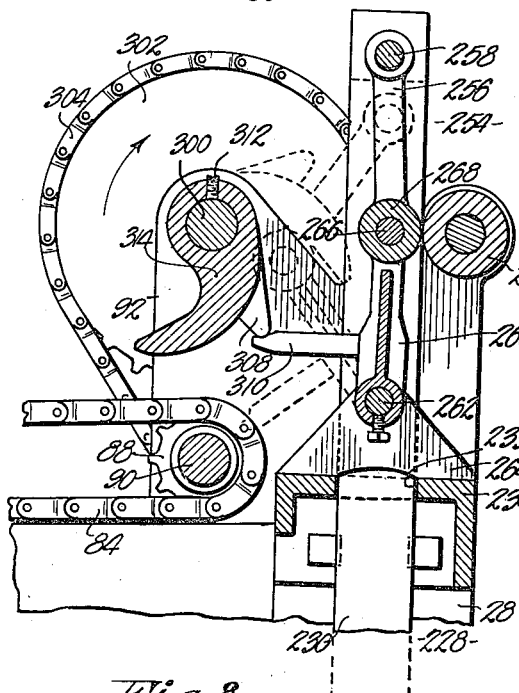
Fig. 8 is an enlarged sectional view showing the release toggle mechanism for controlling the tool shaft support.

Reference will now be had to Figs. 2 and 8 wherein is shown a toggle mechanism 254 having one arm 256 pivoted at 258 to the upper end of carrier frame 228 and its other arm 260 pivoted by pin 262 to ears 264 which are integral with top plate 234. Arms 256 and 260 are pivoted together by pin 266 which also carries a roller 268. The normal position of the toggle 254 is as shown with the arms slightly out of alignment and with the roller 268 resting against a roller 270 carried by frame 28. This positioning of the toggle parts secures it against accidental release and the tool shafts will all be secured in the raised position until released by certain definitely timed mechanism, hereinafter described.

Each tool shaft of one of the tiers carries a tool 276 which is adapted to be rotated to dislodge and remove the residue or slag from the bottom portion of the retort.

Figures 11, 12:
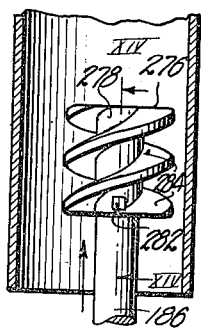
Fig. 11 is a sectional view taken on line XI—XI of Fig. 9.
Fig. 12 is a sectional view taken on line XII—XII of Fig. 10.
Figure 13:
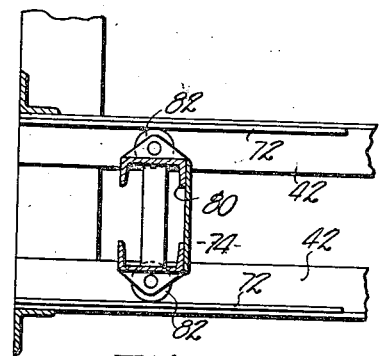
Fig. 13 is an enlarged horizontal sectional view showing the lower guide means for the carriage.
Figure 14:
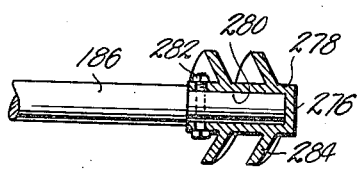
Fig. 14 is a section taken on line XIV—XIV of Fig. 12.

The preferable form of the tool is shown in Figs. 10, 12 and 14. The body 278 of the tool is recessed at 280 to receive the reduced end of the tool shaft 186 to which it is secured by bolt 282. The double helical threads 284 are preferably inclined outwardly and rearwardly as clearly shown in Fig. 14. While other forms of screw conveyor tools might be used, yet this form shown, hugs the surface of the retort to remove slag and carries it from the retort at the proper rate of speed. The threads 284 are right-handed and are adapted to be rotated in the direction indicated by the arrow in Fig. 10, to pull the slag from the retort as the tool is fed therein. The tool 286 carried respectively by each of the tool shafts 290, 292, 294 and 296 of the other tier is similar in structure to tools 276, but the helical screws 288 are made left-handed and are adapted to be rotated in a left-hand direction to convey the slag outwardly from the retorts. The cutting ends of the tools are formed at substantially right angles to the axis to present cutting edges to facilitate cutting into the slag.

When the tools have been moved from the normal position, shown in Fig. 4, to positions at the mouth of the retorts, it is desired to lower the tool shaft support and permit the weight of the tools and associated shafts to be carried by the retort so that it will follow the inside bottom contour thereof. To accomplish this, the release of the tool shaft at the proper time is effected by the following mechanism.

A transverse shaft 300, see Figs. 2 and 8, carried for rotation by bearing plates 92, is provided at one end with a rigidly attached sprocket wheel 302 carrying a sprocket chain 304 which is trained over the small sprocket wheel 306 mounted for rotation with shaft 90. Securely attached to shaft 300 are tripper fingers 308. These fingers are adapted to rotate in a direction indicated by the arrow in Fig. 8, as the tool is being moved into the retort and in the reverse direction as the tool is being moved outwardly from the retort. Arms 310 integral with toggle member extend into the path of travel of fingers 308 as indicated in Fig. 8. Intermediate tripper fingers 308 and secured to shaft 300 by set screw 312, is a cam 314 which rotates with the shaft and is in alignment with the roller 268 of the toggle 254. The operation of this release mechanism is as follows:

In Fig. 4 the parts are in the normal position with the clean-out tools retracted. As the tools are moved forward by means as previously described, the shaft 300 will be rotated in a clockwise direction, as shown in Figs. 4 and 8, and tripper fingers 308 will travel to engage arms 310, moving it downwardly to break the toggle joint so that by gravity the carrier frame 228 will move downwardly as indicated in dotted lines in Fig. 8, just as the tool 276 is partially inserted in the retort 24. The rollers 272 will move downwardly away from the tool shafts and each tool will be free to be supported within the retort. The freeness of movement of the tool will not only permit it to follow any ordinary irregularity of the retort, but will also cause a downward pressure of the tool, thereby facilitating more definite removal of the slag.

As the tool reaches the end of its travel into the retort, the cam 314 will have moved to the position shown in dotted lines in Fig. 8. Motor 118 is now reversed and the carriage 74 together with its associated parts, is caused to travel rearwardly to withdraw the tools from the retorts and to reverse the direction of rotation of shaft 300 to rotate cam 314 in the reverse direction. Just as tool 276 is about to leave the retort, cam 314 engages roller 268, forcing it back to the locked position to support the carrier frame in the raised position so that cradle rollers 272 will engage the tool shafts to support them in the raised position.

The retorts after considerable use, often become distorted at their open ends, and will not be properly aligned to receive the tools which normally are in substantially true vertical alignment, and in such cases, it is found convenient to have means whereby the tool shafts of each tier may be selectively moved transversely to obtain proper positioning of the tool for entering the irregularly positioned retort.

Referring now to Figs. 15 and 16, which show one set of mechanism suitable for moving the shaft 226 transversely, it will be noted that a substantially U-shaped member 316 is pivotally mounted on pin 318 carried by plate 232 directly below shaft 226. Member 316 is weighted at 320 so as to maintain arms 322 in proper upright position at opposite sides of shaft 226. It will be observed that shaft 226 rests on rollers 272 and is normally spaced apart from member 316.

For manually operating member 316, one arm 322 thereof is pivotally connected at 324 to link 326 which is pivoted to arm 328 rigidly mounted on rod 330, rotatably carried by frame 28. Arm 332 secured to oscillate with rod 330, is operatively interconnected by link 334 to one arm of bell crank lever 336, pivotally mounted on rod 338 carried by frame 28. The other arm of bell crank lever 336 is operatively interconnected by link 340 to one end of lever 342, which in turn is pivoted intermediate its ends at 344 to frame 28. The other end of lever 342 is connected to the hand lever 346 by a link 348. As shown in Fig. 2, hand lever 346 is mounted for oscillation on axle 34 and is held in the normal position by means of a link 350 pivoted to hand lever 346 and adapted to engage detent 352 carried by frame 28.

To move the tool shaft transversely, the operator moves the hand lever 346 in either direction, thus causing the U-shaped member 316 to oscillate and engage shaft 226 and cause the tool to be moved in the desired direction so that it will register with its associated retort.

While complete mechanism connecting each of the operating levers 346 with its respective U-shaped member has not been shown, however, it is apparent that in each instance, the mechanism would be similar in principle to that just described.

The following manual means for moving the machine along the track rails 40, consists of a sprocket wheel 354 operatively engaging a sprocket chain 356, which engages a sprocket wheel 358 rigidly secured to shaft 360 mounted in a bracket 362 carried by frame 28. The shaft 360 is provided with a rigidly attached worm gear 364 which rotates therewith. A shaft 336 is disposed at a right angle to shaft 360 and carries a worm 368 which meshes with worm gear 364. The shaft 366 is also mounted in bracket 362 and has a hand wheel 370 fixed to its outer end to facilitate easy operation of the driving mechanism. Since there is very little movement of the machine along the tracks, this hand operated means has proven very convenient, however, motor driven means might be substituted therefor without altering the general functioning of the machine.

A water cooling system including manifolds 372 with branches 374, each having a spray nozzle 376 to direct water against the heated front portion of the machine is provided. Control valves 378 positioned in branches 376 permits of definite control of water through the various branches. The water supply line is connected to the spray system by the union 380.

In the diagrammatic front elevation of the zinc retort furnace, the three vertical tiers of retorts have been designated as C, D and E respectively. The center distances between the two tiers of clean-out tools and between the retort tiers C and E are identical under normal conditions so that two tiers of retorts may be simultaneously cleaned by the machine as shown. Since each retort furnace contains a large number of tiers of retorts, it might be found expedient to add more clean-out units to the machine to facilitate more rapid operation. Since the clean-out tools 276 rotate in one direction and the tools 286 rotate in the opposite direction, it is apparent that this reverse movement of the tools will tend to centralize the machine and secure it against travel on the rails 40, and for this reason, it is deemed best to provide the tiers of clean-out tools in pairs.

*Operation*

Referring now to Figs. 5 and 6, an explanation of the general operation of the machine will be given. The machine is positioned on the track so that the tier of tools 276 registers with the tier C of retorts. This set of tools is rotated and moved into retorts C, thus cleaning the slag from the right side of the bottom. The tools are now moved to the normal retracted position and the machine is moved to the next tier of retorts D and the same clean-out operation is repeated and the tools again retracted.

At the next operation, both tiers of tools 276 and 286 are operated in tiers of retorts E and C respectively, thus cleaning opposite sides of the two tiers simultaneously. This last operation will then be repeated through the various tiers of retorts until the last two retorts are reached, when similar single operations will need to be had as that just described relative to tiers C and D.

This invention is an improvement over my pending application (Serial No. 236,749, filed October 24, 1938).

The method of cleaning the retort tubes by this machine might be varied to a considerable degree by controlling and varying the distance of travel of the various parts. For example, the tools may be extended into the retorts about half of the length of the retort, removed, and then again inserted to complete the full stroke. After these two operations it is sometimes found expedient to again insert the tool while it is rotated and then drag it out while the rotating means is idle. This last operation will tend to remove the residue that might be left in the bottom central portion of the retort after the first two operations. The number of partial inserts in cleaning each retort will be governed to some degree, to the conditions set up in the furnace being cleaned.

The right-hand clean-out tool 276 having the helical cutting and conveying ribs 284, when rotated to the right, as shown, will tend to hug the right-hand side of the retort and the left-hand clean-out tool will rotate to the left and will naturally tend to hug the left-hand side of the retort.

The diameter of the clean-out tool is somewhat less than the inside diameter of the retort, thus making it possible for the tool to be inserted in the retort that has been deformed by long use.

This method of operation not only provides a rapid and complete cleaning of the retorts, but also performs the operation with a minimum amount of retort breakage.

While certain novel features of the invention have been set forth in the annexed claims, it will be understood that various omissions, substitutions, and changes may be made by those skilled in the art without departing from the spirit of the invention.

Having thus described the invention, what is claimed as new and desired to be secured by Letters Patent is:

1. In a retort clean-out machine a movable frame; a pair of laterally spaced carriers mounted for reciprocation in said frame; a rotary means carried by each of said carriers adapted to rotate in opposite directions; a tool shaft universally interconnected with each of said rotary members; a right-hand helical screw tool carried by one of said tool shafts; and a left-hand helical screw tool carried by the other of said tool shafts, said tools being formed and driven to convey material toward the mouths of the respective retorts being cleaned.

2. In a retort clean-out machine a movable frame; a carrier mounted for rectilinear movement in said frame; a stub shaft mounted for rotation in said carrier; a tool shaft universally interconnected to one end of said stub shaft for rotation therewith; a vertically adjustable cradle adapted to support said tool shaft intermediate its ends; means selectively operable to move said tool shaft transversely in said cradle; a clean-out tool carried by the free end of said tool shaft; and means operable to reciprocate said carrier and cause said tool shaft to be longitudinally reciprocated.

3. In a retort clean-out machine a movable frame; a carrier mounted for rectilinear movement in said frame; a stub shaft mounted for rotation in said carrier; a tool shaft universally interconnected to one end of said stub shaft for rotation therewith; a vertically adjustable cradle adapted to support said tool shaft intermediate its ends; manually operable means selectively operable to move said tool shaft transversely in said cradle whereby the free end of said shaft may be shifted to effect engagement of the tool carried thereby with a selected portion of the retort; a clean-out tool carried by the free end of said tool shaft; means operable to reciprocate said carrier and cause said tool shaft to be longitudinally reciprocated; and means operable to move said cradle downwardly from the operative shaft supporting position.

4. In a retort clean-out machine a movable frame; a carrier mounted for rectilinear movement in said frame; a stub shaft mounted for rotation in said carrier; a tool shaft universally interconnected to one end of said stub shaft for rotation therewith; a vertically adjustable cradle adapted to support said tool shaft intermediate its ends; means manually operable to rock said cradle to move said tool shaft transversely with respect to said carrier; a clean-out tool carried by the free end of said tool shaft; and means operable to reciprocate said carrier and cause said clean-out tool to move to and from a point beyond said frame as it is being rotated.

5. In a cleaning mechanism for retort furnaces having a bank of retorts arranged in substantially regularly spaced tiers; a movable frame; a carriage mounted for reciprocation in said frame, in a direction substantially parallel with the axis of said retorts; motor driven rotary members carried by said carriage; a tool shaft universally connected for rotation with each of said rotary members; means normally supporting said tool shafts in substantially axial alignment with the respective retorts; a helical conveyor tool carried by the free end portion of each of said tool shafts for rotation therewith, and means responsive to the advancing of the frame, to move the supporting means from supporting position.

6. In a cleaning mechanism for retort furnaces having, a bank of retorts arranged in substantially regularly spaced tiers; a movable frame; two laterally spaced apart carriages suspended for reciprocation in said frame, in a direction substantially parallel with the axis of said retorts; a series of motor driven rotary members carried by each of said carriages, the rotary members of one series being rotated in the reverse direction from the rotary members of the other series; a vertically disposed series of tool shafts universally interconnected with the respective rotary members of each of said series for rotation therewith; a tool having right-hand, helical conveyor threads rigidly carried by each of the tool shafts of one of the series and a tool having left-hand, helical conveyor threads rigidly carried by each of the tool shafts of the other series; and manually operable means to selectively move said tool shafts transversely of their carriages.

7. In a cleaning mechanism for retort furnaces having a bank of retorts arranged in substantially regularly spaced tiers; a movable frame; two spaced apart carriages mounted for reciprocation in said frame, in a direction substantially parallel with the axis of said retorts; a series of motor driven rotary members carried by each of said carriages, the rotary members of one series being rotated in the reverse direction from the rotary members of the other series; a vertically disposed series of tool shafts universally interconnected with the respective rotary members of each of said series for rotation therewith; a tool having righthand, helical conveyor threads rigidly carried by each of the tool shafts of one of the series and a tool having lefthand, helical conveyor threads rigidly carried by each of the tool shafts of the other series, vertically adjustable means for supporting the tool carrying end of said tool shafts in alignment with the respective retorts when they are positioned outside the retorts and manually operable means for laterally adjusting the tool shafts of one series relative to the tool shafts of the other series.

8. In a cleaning machine for retorts having a bank of retorts arranged in substantially regularly spaced tiers; a movable frame; transversely disposed carriers mounted in said frame for reciprocation in alignment with the axis of said retorts; means for selectively and simultaneously reciprocating said carriers; tool shafts universally carried at their one end by said carriers with their free ends universally movable to follow the inner contour of the retort; a helically threaded tool carried by each of said tool shafts and adapted to rotate therewith, certain of said tools having right-hand helix and the other tools having left-hand helix; means to rotate said tool shafts and associated tools whereby materials are forced from said retorts by each of said tools; vertically adjustable carriers adapted to support the tool shafts above the bottom walls of adjacent retorts; means to release said tool shaft supporting means whereby the tool shaft is carried by the bottom wall of the retort and means selectively operable to move said tool shafts transversely without movement of said frame.

9. In a cleaning machine for retort furnaces having a bank of retorts arranged in substantially regularly spaced tiers; a movable frame; transversely disposed carriers mounted in said frame for reciprocation in alignment with the axis of said retorts; means for selectively and simultaneously reciprocating said carriers; tool shafts universally carried at their one end by said carriers with their free ends universally movable to follow the inner contour of the retort; a helically threaded tool carried by each of said tool shafts and adapted to rotate therewith, certain of said tools having right-hand helix and the other tools having left-hand helix; means to rotate said tool shafts and associated tools whereby materials are forced from said retorts by each of said tools; and vertically adjustable carriers adapted for vertical adjustment to support the tool shafts above the bottom walls of adjacent retorts; and manually controlled means operable to selectively move the free ends of said tool shaft transversely of said retorts without movement of said frame.

THOMAS P. MORRISON.